(No Model.)

T. HOLMAN.
SCREEN CLEANING DEVICE.

No. 271,847. Patented Feb. 6, 1883.

WITNESSES:
C. Neveux
T. Sedgwick

INVENTOR:
T. Holman
BY Munn & Co
ATTORNEYS.

UNITED STATES PATENT OFFICE.

THOMAS HOLMAN, OF SALEM, OREGON.

SCREEN-CLEANING DEVICE.

SPECIFICATION forming part of Letters Patent No. 271,847, dated February 6, 1883.

Application filed June 12, 1882. (No model.)

*To all whom it may concern:*

Be it known that I, THOMAS HOLMAN, of Salem, Marion county, Oregon, have invented a new and useful Improvement in Screen-Cleaning Devices, of which the following is a full, clear, and exact description.

My invention relates to improvements in screen-cleaning devices; and it consists in the peculiar construction and arrangement of the parts, as hereinafter more fully set forth, and pointed out in the claims.

Reference is to be had to the accompanying drawings, forming a part of this specification, in which similar letters of reference indicate corresponding parts in both figures.

Figure 1:
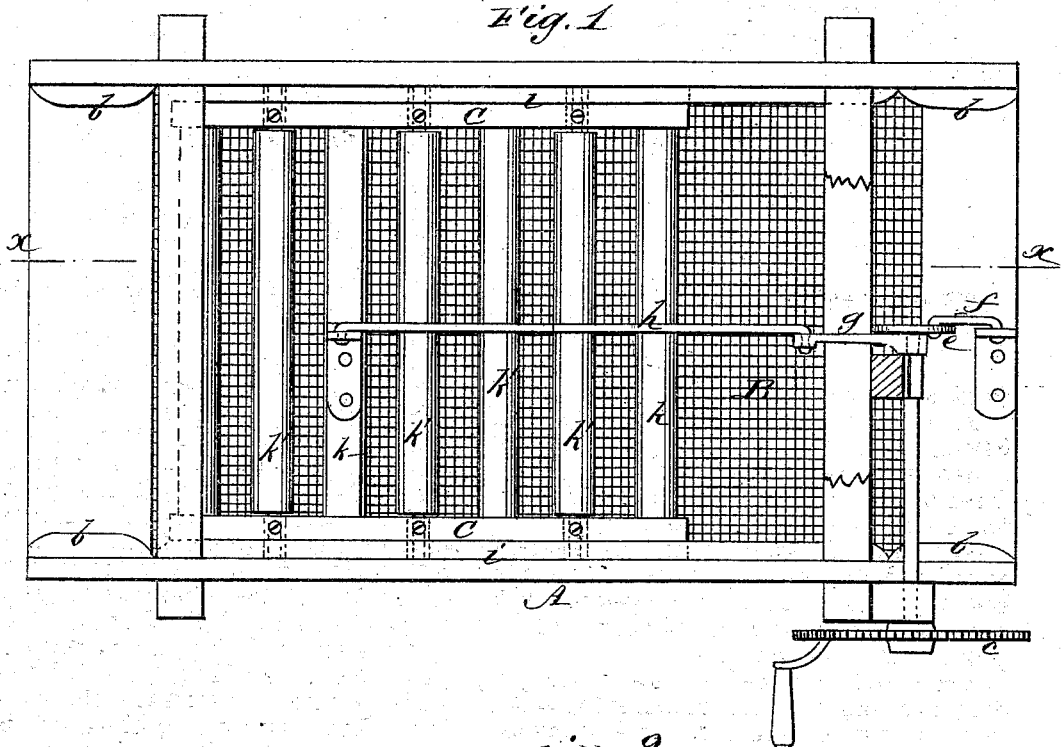
Figure 2:
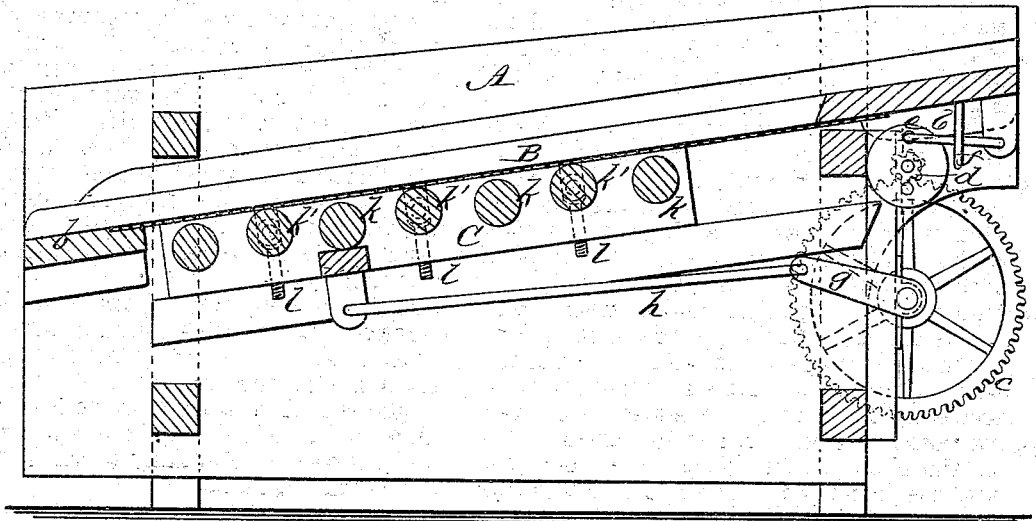

Figure 1 represents an inverted plan of a screening or sifting apparatus, with a roller rubbing or cleaning frame applied to the screen or sifting-cloth thereof in accordance with my invention. Fig. 2 is a vertical horizontal section of the same on the line $x$ $x$ in Fig. 1.

A is the frame of the apparatus, which may be of any suitable construction; and B, its reciprocating inclined screen, arranged to move on ways $b$ $b$. Said screen may be operated by a spur-wheel, $c$, gearing with a pinion, $d$, that actuates a crank, $e$, which is connected with the screen by a rod, $f$; or it may be reciprocated by any other suitable mechanism.

C is the roller rubbing-frame, arranged beneath the screen, and which may, if desired, be stationary, but is preferably made to reciprocate in direction of the screen, and is here represented as reciprocated by a crank, $g$, fast on the shaft of the wheel $c$, and connected with the frame C by a rod, $h$, said frame traveling on bearing strips or ways $i$ $i$.

The sifting cloth or screen B is cleaned by its contact with rubbers $k$ $k'$, of wood or any other suitable material, mounted in or on the frame C, and arranged to occupy a position transversely of the screen. These rubbers are of cylindrical or curved form. Certain of them, $k$, may be fixed; but the other intermediate ones, $k'$, form rollers, which are free to turn in journal-boxes arranged in the side pieces of the rubber-frame, and adjustable up or down by set-screws $l$, to regulate their contact with the sifting-cloth and for taking the weight of the screen from off the rubbers, so as not to injure the sifting-cloth. The rollers $k'$ roll or move with the screen during its reciprocating movement, thereby avoiding injury of the cloth, while the fixed or stationary rubbers $k$ are relieved from any heavy pressure on them by the sagging of the cloth. When the rubber-frame is reciprocated it should move at a different velocity from that of the screen, as shown in the drawings. In this way or by these means the screen is kept open and clean for the proper performance of its work, the rotating rubbers $k'$ and fixed rubbers $k$ operating most effectually to produce this result.

Having thus described my invention, I claim as new and desire to secure by Letters Patent—

1. The combination of a reciprocating roller rubbing-frame and the reciprocating screen, arranged to move over and in contact with the rollers or rubbers of said frame, essentially as described.

2. The rubbing-frame C, provided with fixed rubbers $k$ and rotating rubbing-rollers $k'$, adjustable up or down within said frame, in combination with the reciprocating screen B, arranged over said rubbers and rollers for operation on the rollers and in relation with the fixed rubbers, substantially as and for the purposes herein set forth.

THOMAS HOLMAN.

Witnesses:
L. F. CHADWICK,
E. J. DAUNE.